(12) United States Patent
Davis et al.

(10) Patent No.: US 9,500,202 B1
(45) Date of Patent: Nov. 22, 2016

(54) THRUST BEARING SURFACE FOR FLOATER-STYLE CENTRIFUGAL PUMPS

(71) Applicant: Summit ESP, LLC, Tulsa, OK (US)

(72) Inventors: Gregory Austin Davis, Broken Arrow, OK (US); Freddie George Walton, Midland, TX (US); David Thomas Jolly, Midland, TX (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 15/160,850

(22) Filed: May 20, 2016

Related U.S. Application Data

(60) Provisional application No. 62/164,829, filed on May 21, 2015.

(51) Int. Cl.
| | |
|---|---|
| *F04D 29/041* | (2006.01) |
| *F16C 32/06* | (2006.01) |
| *F04D 1/00* | (2006.01) |
| *F04D 7/04* | (2006.01) |
| *F04D 29/043* | (2006.01) |
| *F04D 29/046* | (2006.01) |
| *F04D 29/22* | (2006.01) |

(52) U.S. Cl.
CPC .............. *F04D 29/041* (2013.01); *F04D 1/00* (2013.01); *F04D 7/04* (2013.01); *F04D 29/043* (2013.01); *F04D 29/046* (2013.01); *F04D 29/2205* (2013.01); *F16C 32/0685* (2013.01); *F16C 2360/44* (2013.01)

(58) Field of Classification Search
CPC .............. F04D 1/00; F04D 1/04; F04D 1/06; F04D 7/00; F04D 7/02; F04D 7/04; F04D 29/041; F04D 29/0413; F04D 29/046; F04D 29/0462; F04D 29/047; F04D 29/0473; F04D 29/0476
See application file for complete search history.

(56) References Cited

U.S. PATENT DOCUMENTS 7,575,413 B2 * 8/2009 Semple .................. F04D 1/063
 384/275
8,684,679 B2 4/2014 Tetzlaff et al.

\* cited by examiner

*Primary Examiner* — Richard Edgar
(74) *Attorney, Agent, or Firm* — Frederic Dorwart, Lawyers; Penina Michlin Chiu

(57) ABSTRACT

A thrust bearing surface for a floater-style centrifugal pump is described. A thrust bearing system includes a rotatable member including a sleeve, and a flange extending radially on a downstream side of the sleeve, a swirling member on a top of the flange, the swirling member extending axially towards an impeller bottom, wherein as the swirling member rotates, the swirling member guides working fluid in an outwards and upwards direction from the swirling member. A rotating member of a thrust bearing surface includes a sleeve securable to a rotatable shaft of a stage, a flange extending radially around a top of the sleeve, and at least one swirling member extending axially downstream from a top of the flange towards a bottom of an impeller, wherein each of the at least one swirling member extends from an outer diameter towards an inner diameter of the flange.

23 Claims, 4 Drawing Sheets

THRUST BEARING SURFACE FOR FLOATER-STYLE CENTRIFUGAL PUMPS

CROSS REFERENCE TO RELATED APPLICATIONS

This application claims the benefit of U.S. Provisional Application No. 62/164,829 to Davis et al., filed May 21, 2015 and entitled "LEAK RESISTANT FLANGED SLEEVE," which is hereby incorporated by reference in its entirety.

BACKGROUND OF THE INVENTION

1. Field of the Invention

Embodiments of the invention described herein pertain to the field of floater-style centrifugal pump stages. More particularly, but not by way of limitation, one or more embodiments of the invention enable a thrust bearing surface for floater-style centrifugal pumps.

2. Description of the Related Art

Fluid, such as natural gas, water, oil or other hydrocarbons, is often located in underground formations. In such situations, the fluid is commonly pumped to the surface so that it can be collected, separated, refined, distributed and/or sold. Centrifugal pumps are typically used in submersible pump applications for lifting well fluid to the surface. Centrifugal pumps impart energy to a fluid by accelerating the fluid through a rotating impeller paired with a stationary diffuser. A rotating shaft runs through the central hub of the impeller and diffuser. A motor upstream of the pump turns the shaft of the pump motor. The shaft of the pump motor turns the pump shaft, and the impeller is keyed to the pump shaft, causing the impeller to rotate with the pump shaft.

Each rotating impeller and stationary diffuser pair is called a "stage". The impeller's rotation confers angular momentum to the fluid passing through the pump. The angular momentum converts kinetic energy into pressure, thereby raising the pressure on the fluid and lifting it to the surface. Multiple stages of impeller and diffuser pairs may be used to further increase the pressure lift. The stages are stacked in series around the pump's shaft, with each successive impeller sitting on a diffuser of the previous stage.

As fluid moves upward through the pump, the rotating impellers exert a downward force as discharge pressure acts on the top of the impeller. The pump also experiences upward force from discharge pressure acting against the bottom of the impeller, and also due to the force produced by the momentum of the fluid making its turn in the impeller passageway. These axial forces are referred to as "thrust" experienced by the pump. Pumps capable of handling higher down thrust loads are able to operate at lower rates, which is beneficial due to extended operating ranges.

In both radial and mixed flow stages, one approach to handling the axial thrust of the pump is to allow each impeller to move axially on the pump shaft between the diffusers. In such instances, the impeller is keyed to the shaft within a key groove that runs axially along the length of the shaft. When the impellers can move independently of the shaft, the pump is referred to as a "floater style" pump.

To further improve a pump's thrust handling capabilities, thrust bearing surfaces consisting of a conventional nonrotating bushing and a conventional rotating flanged sleeve are typically inserted into pump stages. Together, the conventional bushing and conventional flanged sleeve form a conventional thrust bearing set. Typically, the conventional bushing is attached to the wall of the diffuser of the submersible pump and should not rotate. The sleeve is keyed to the shaft of the submersible pump and rotates with the shaft as fluid is pumped to the surface of a well. The conventional bushing is positioned concentrically around the conventional flanged sleeve, such that the conventional sleeve rotates within the bushing. As the pump operates, fluid is pulled between the bearing surfaces, increasing the pump's ability to handle thrust loads by providing hydrodynamic lift.

A conventional sleeve is illustrated in FIG. 1. As shown in FIG. 1, in conventional floater stages, conventional sleeve 100 includes a thin, disc-shaped conventional flange 105 at the top of the conventional sleeve. The flange is typically between 0.08 inches and 0.200 inches in thickness. The conventional flanged surface rotates inside the pump fluid, and also makes contact with a standoff sleeve. The standoff sleeve only makes contact with a narrow portion of the conventional flanged sleeve 100, closest to the shaft. The standoff sleeve supports the impeller. and the standoff sleeve length determines the operating height of the impeller. The standoff sleeve is typically Ni-resist austenitic cast iron alloy or stainless steel if shimmed.

Abrasives such as consolidated and unconsolidated sand, quartz or iron sulfide commonly mix with fluid pumped from downhole formations. As the fluid moves through the pump, the abrasives damage the pump components through erosive wear, and thrust bearings are no exception. Although thrust bearings are conventionally made of hard materials such as titanium carbide, tungsten carbide or silicon carbide, the thrust bearings are still susceptible to erosive wear from abrasives. Erosive wear to the thrust bearings causes them to leak, and the leakage reduces the hydrodynamic lift provided by the bearings and undesirably decreases head.

It would be an advantage for thrust bearings to have improved abrasive handling capability and improved resistance to leaks. Therefore, there is a need for improved thrust bearing surface for floater-style centrifugal pumps.

BRIEF SUMMARY OF THE INVENTION

A thrust bearing surface for floater-style centrifugal pumps is described. An illustrative embodiment of a rotating member of a thrust bearing surface includes a sleeve securable to a rotatable shaft of a stage, a flange extending radially around a top of the sleeve, and at least one swirling member extending axially downstream from a top of the flange towards a bottom of an impeller, wherein each of the at least one swirling member extends along the top of the flange from an outer diameter towards an inner diameter of the flange. In some embodiments there are a plurality of swirling members arranged circumferentially around the top of the flange. In certain embodiments, each of the at least one swirling member terminates prior to the inner diameter to form a clearance occupied by one of an impeller hub or a standoff sleeve. In some embodiments, each of the at least one swirling member is one of fin, ramp or foil shaped. In certain embodiments, the flange comprises a circumferential chamfer and the at least one swirling member extends over at least a portion of the chamfer. In some embodiments, each swirling member is a ramp comprising a sloped top surface and the sloped surface slopes upwards towards a trailing edge of the swirling member. In some embodiments, each of the at least one swirling member comprises one of a beveled leading edge or a beveled corner on a top surface of the at least one swirling member. In certain embodiments, each of the at least one swirling member commences at the outer diameter and terminates prior to the inner diameter of the top of the flange. In some embodiments, each of the at least one swirling member commences at the outer diameter and terminates at the inner diameter of the top of the flange. In certain embodiments, the at least one swirling member is a single foil.

An illustrative embodiment of a centrifugal pump includes a rotatable shaft, an impeller stacked on the shaft, a rotatable sleeve secured around the shaft below the impeller, the sleeve comprising a flange extending radially on a downstream side of the rotatable sleeve, and a swirling member protruding axially downstream from the flange. In some embodiments, the swirling member is one of a hexafoil, quatrefoil or enneafoil. In certain embodiments, wherein the swirling member holds the impeller in a running position. In some embodiments, a standoff sleeve extends between the swirling member and the rotatable shaft. In certain embodiments, the swirling member is one of a ramp or fin.

An illustrative embodiment of a thrust bearing system for a floater-style stage includes a thrust bearing surface including a rotatable member, the rotatable member comprising a tubular sleeve and a flange extending radially on a downstream side of the tubular sleeve, a swirling member on a top of the flange, the swirling member extending axially towards a bottom of an impeller, wherein as the swirling member rotates, the swirling member guides working fluid in an outwards and upwards direction from the swirling member. In some embodiments the swirling member includes a plurality of fins. In certain embodiments, there are five fins spaced around the top of the flange. In some embodiments, each of the plurality of fins extends radially between an outer diameter and inner diameter of the radial surface of the flange. In certain embodiments, the swirling member is a foil. In some embodiments, one of a hub of the impeller or a standoff sleeve extends between the swirling member and a shaft, the rotatable member secured to the shaft. In some embodiments, the thrust bearing surface is downhole in subsurface formation and the working fluid comprises one of water, oil, natural gas or a combination thereof.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein.

Figure 1:
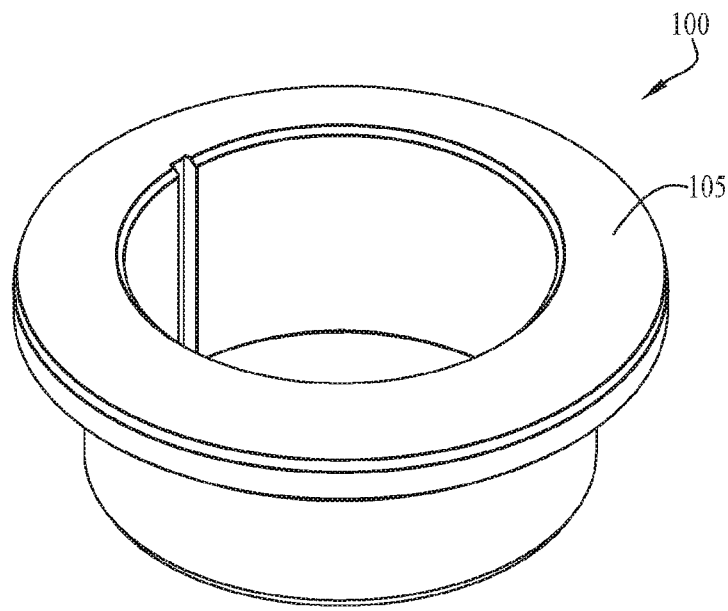
FIG. 1 is a perspective view of a conventional flanged sleeve of the prior art.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

A thrust bearing surface for floater-style centrifugal pumps now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a swirling member includes one or more swirling members.

"Coupled" refers to either a direct connection or an indirect connection (e.g., at least one intervening connection) between one or more objects or components. The phrase "directly attached" means a direct connection between objects or components.

"Downstream" refers to the direction along a centrifugal pump shaft away from the pump's motor and towards production tubing and/or the pump discharge. Thus by way of example and without limitation, in a vertical downhole submersible pump assembly, the downstream direction may be towards the surface of the well. The "top" of an element refers to the downstream side of the element.

"Upstream" refers to the direction along a centrifugal pump shaft towards the pump's motor and away from production tubing and/or the pump discharge. Thus by way of example and without limitation, in a vertical downhole submersible pump assembly, the upstream direction may be towards the bottom of the assembly and/or deeper in the ground. The "bottom" of an element refers to the upstream side of the element.

As used in this specification and the appended claims, the terms "inner" and "inwards" with respect to a thrust bearing or other pump assembly component refer to the radial direction towards the center of the shaft of the pump assembly and/or the center of the aperture of the component through which the shaft would extend.

As used in this specification and the appended claims, the terms "outer" and "outwards" with respect to a thrust bearing or other pump assembly component refer to the radial direction away from the center of the shaft of the pump assembly and/or the center of the aperture of the component through which the shaft would extend.

As used in this specification and the appended claims, the term "axial" and "axially" refers to the longitudinal direction parallel to the length of the shaft of the centrifugal pump.

The inventors have observed a problem in conventional submersible pumps. During operation, solid-laden fluid that should be moving upward towards the surface of the well, and has conventionally been thought to move upward, instead actually seeps down through the conventional flanged sleeve and flows back to the stage below. This seepage decreases head and erodes the bushing as fluid and abrasives flow down the pump due to leaks in conventional flanged sleeves.

Illustrative embodiments of the invention described herein provide an improved thrust bearing surface for floater-style centrifugal pump stages. The raised shapes formed on the top (downstream) face of the flanged sleeve of illustrative embodiments may positively impact the hydrodynamic flow, or barrier, created around the thrust bearing by rotation of the flanged sleeve during operation of the centrifugal pump. By altering this flow and/or barrier, the potential for fluid to leak or bypass back into the previous pump stage may be reduced and therefore increase pump head per stage, which may improve overall efficiency. Swirling the flow of pumped fluid upwards and outwards from the flange may reduce erosion to the bushing that may occur as small abrasives such as quartz or iron sulfide fall downwards during pumping operations. Illustrative embodiments may guide such small abrasives upwards and outwards into the successive pump stage, rather than downwards to previous stages. Illustrative embodiments may carry a higher thrust load and therefore operate at or below the volumetric rate (barrels per day) of the same style of pump not making use of thrust bearings.

A swirling member may extend axially from and/or be raised above the downstream surface of the flange of the rotatable sleeve. In some embodiments, the swirling members may be fin, ramp or foil shaped. These axially protruding swirling member(s) may extend towards the bottom of an impeller, impeller hub and/or standoff sleeve. During rotation of the flanged sleeve, the swirling member of illustrative embodiments may cause pumped fluid to swirl upwards and outwards from the thrust bearings installed in the pump, and thus may prevent or reduce leakage of pumped fluid downwards towards preceding stages.

The thrust bearing surface of illustrative embodiments may be a rotating member of a thrust bearing set. The rotating member may be secured to the pump shaft, for example by friction or key, such that the rotating member rotates with the shaft. The rotating member may be paired with a stationary member, such as a bushing. The stationary member may be pressed into the wall of a diffuser or carrier by interference fit or glue and not substantially rotate during operation of the pump. The rotating member may be a flanged sleeve and be included in one or more centrifugal pump stages to increase the thrust handling ability of the pump. The centrifugal pump of illustrative embodiments may be a multi-stage centrifugal pump or a charge pump, for example employed in an electric submersible pump (ESP) assembly in a downhole and/or underground formation application for pumping oil, water, natural gas or a combination thereof. In some embodiments, the thrust bearing surface of illustrative embodiments may be included in gas separator stages included in an ESP assembly.

While for illustration purposes, illustrative embodiments are described herein in terms of a thrust bearing set of a centrifugal pump, nothing herein is intended to limit the invention to those embodiments. Other components of ESP assemblies which may include stages and/or thrust bearings, such as a charge pump or gas separator may also make use of the improved flanged sleeve of illustrative embodiments. In addition, any centrifugal pump encountering abrasive materials, such as horizontal surface pumps, may also make use of the improved flanged sleeve of illustrative embodiments.

In illustrative embodiments, a flanged sleeve of a thrust bearing set may be shaped to include a swirling member on a top (downstream) surface of the flange. The shape of the swirling member may be selected depending on pump conditions, the nature of the pumped fluid and the ambient conditions in the geological formation or other pump location. The axial height of swirling members should be sufficient to modify the flow path of pumped fluid at the inlet of the impeller and edge of the flanged sleeve. In one example, the axial height of swirling members may extend between 5/8 inch and 1 1/4 inch from the top surface of the flange, depending on the type and size of stage employed. The flanged sleeve of illustrative embodiments may replace a conventional standoff sleeve or may be used in conjunction with a standoff sleeve. In embodiments where the flanged sleeve replaces a standoff sleeve, the axial height of the flanged sleeve of illustrative embodiments may be determined so as to provide for the appropriate impeller running height, which may be determined so the pump may operate as if in compression.

Figure 2:
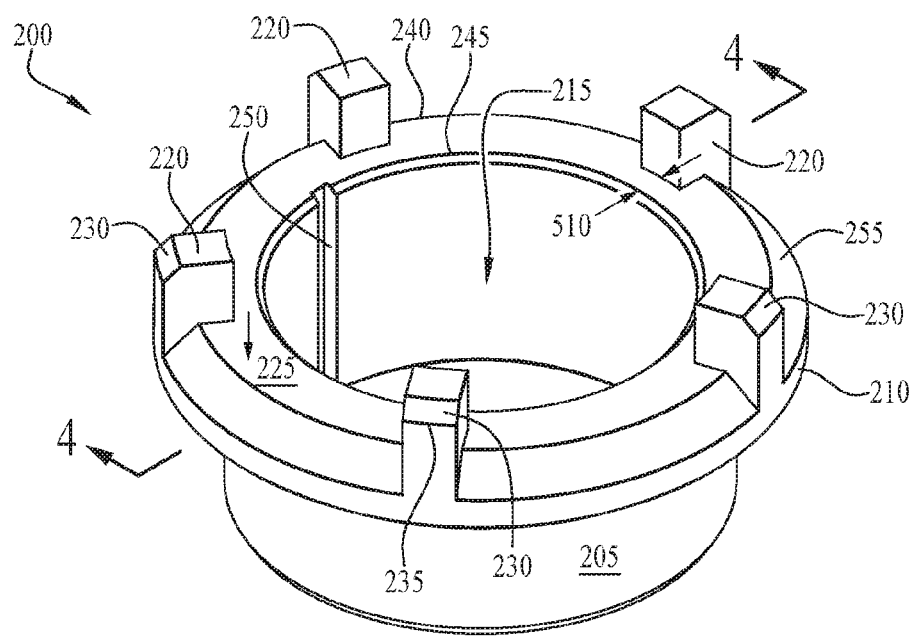
FIG. 2 is a perspective view of a flanged sleeve with fin-shaped swirling members of an illustrative embodiment.

FIG. 2 illustrates an exemplary rotatable thrust bearing surface of an illustrative embodiment. Rotating member 200 may be the rotatable member of a thrust bearing set. As shown in FIG. 2, rotating member 200 may be a flanged sleeve including sleeve 205 and flange 210. Sleeve 205 may be tubular in shape such that the shaft of the centrifugal pump may extend longitudinally through central aperture 215. Sleeve 205 may include keyway 250 for purposes of securing rotating member 200 to the rotatable shaft 615 (shown in FIG. 6) of the pump, charge pump or gas separator in which the abrasion resistant trim (AR trim) is employed. Flange 210 may extend radially and circumferentially around the shaft and/or central aperture 215 in a symmetric disc shape, and may include chamfer 255 around its outer, top edge.

One or more swirling members may be formed, placed, jut, extend and/or protrude upwards (downstream) on downstream surface 225 (top) of flange 210. An exemplary embodiment of a rotatable thrust bearing with swirling members is illustrated in FIG. 2. In FIG. 2, swirling members are fins 220 that extend downstream towards an impeller hub and/or standoff sleeve, and also radially from outer diameter 240 towards inner diameter 245. Fins 220 may be shaped similarly to a rectangular prism or aquatic animal fin, and may follow the shape of flange 210 on the bottom surface of fin 220. In some embodiments, such as shown in FIG. 2, fins 220 may not reach inner diameter 245, but instead stop short of inner diameter 245. Fins 220 may commence at outer diameter 240 and terminate short of inner diameter 245 forming clearance 510. Clearance 510 may allow a standoff sleeve or impeller hub to contact inner diameter 245 of flange 210. In embodiments where flange 210 includes chamfer 255, fins 220 may extend over chamfer 255 so as to be flush with and/or extend all the way to outer diameter 240 of flange 210. Fins 220 may be wedges, paddles, blades, ribs or wings. Fins 220 may be arranged around downstream surface 225 (top) of flange 210. For example, two fins may be spaced at 180 degree intervals, three fins 220 may be spaced every 120 degrees, five fins 220 may be spaced every 72 degrees as shown in FIG. 2, etc.

Fins 220 may include bevel 230 on outer edge 235, which may be a leading edge, top edge and/or outer, top edge of fins 220.

Figure 4:
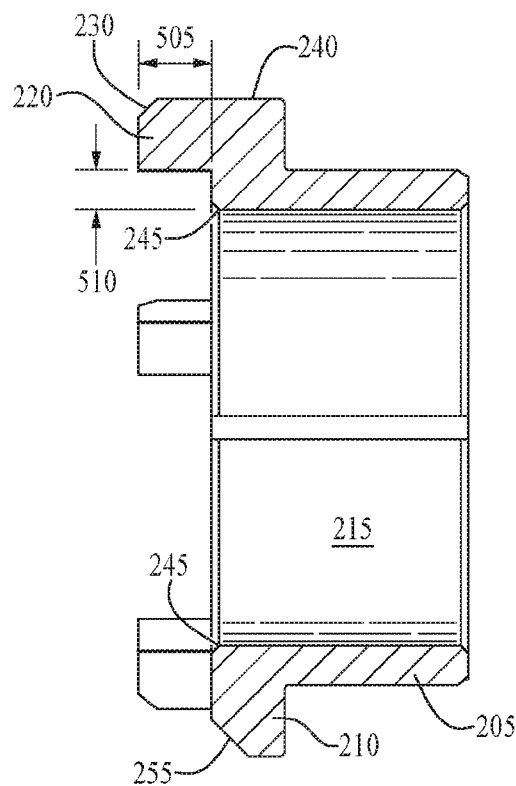
FIG. 4 is a cross sectional view across line 4-4 of FIG. 2 of a flanged sleeve with a swirling member of an illustrative embodiment.

FIG. 4 illustrates a cross-sectional view of a finned flanged sleeve of illustrative embodiments. FIG. 4 illustrates axial height 505 of fin 220 that extends in a downstream direction, clearance 510 and cross sectional shape of an exemplary fin 220 of illustrative embodiments. In one exemplary embodiment, axial height 505 may be between 5/8 inch and 1¼ inches.

Figure 3:
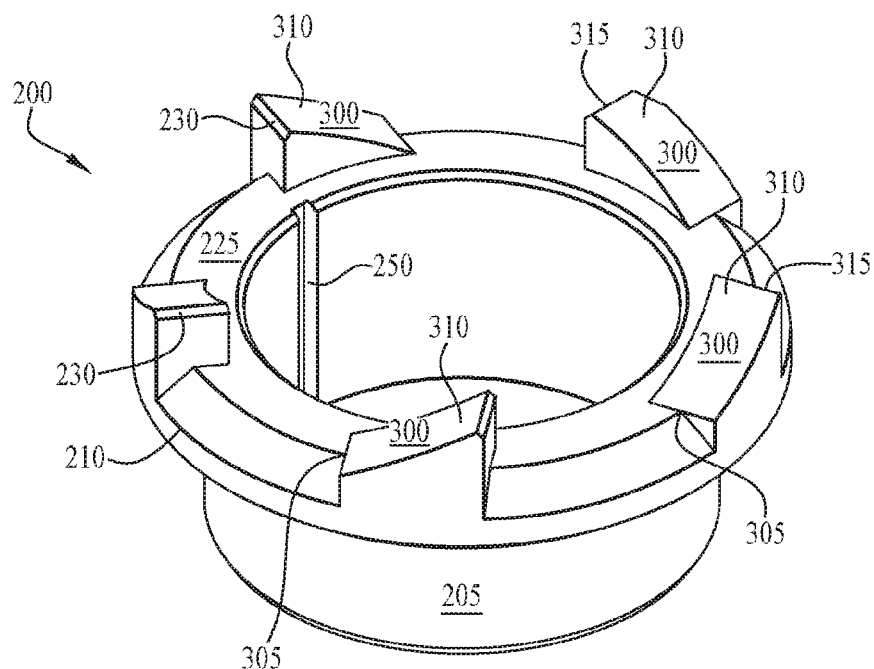
FIG. 3 is a perspective view of a flanged sleeve with ramp-shaped swirling members of an illustrative embodiment.

FIG. 3 illustrates a rotatable bearing surface with swirling members of an illustrative embodiment. In the embodiment of FIG. 3, swirling members are ramps 310 that include ramped surface 300. Ramped surface 300 may decline towards leading edge 305 and increase in height towards trailing edge 315. Ramped surface 300 may be sloped and/or curved and guide, scoop and/or swirl abrasive solids upwards towards a successive stage, rather than permitting such abrasive media to fall downwards. Flange 210 may be molded to include ramps 310 and/or fins 220 as one continuous piece, and/or the swirling members may be braised onto downstream surface 225, ground or adhered. Ramps 310 and/or fins 220 may comprise the same material as the remainder of rotating member 200, for example titanium carbide, silicon carbide or tungsten carbide. As shown in FIG. 3, five ramps 310 are spaced evenly around flange 210.

Figure 5:
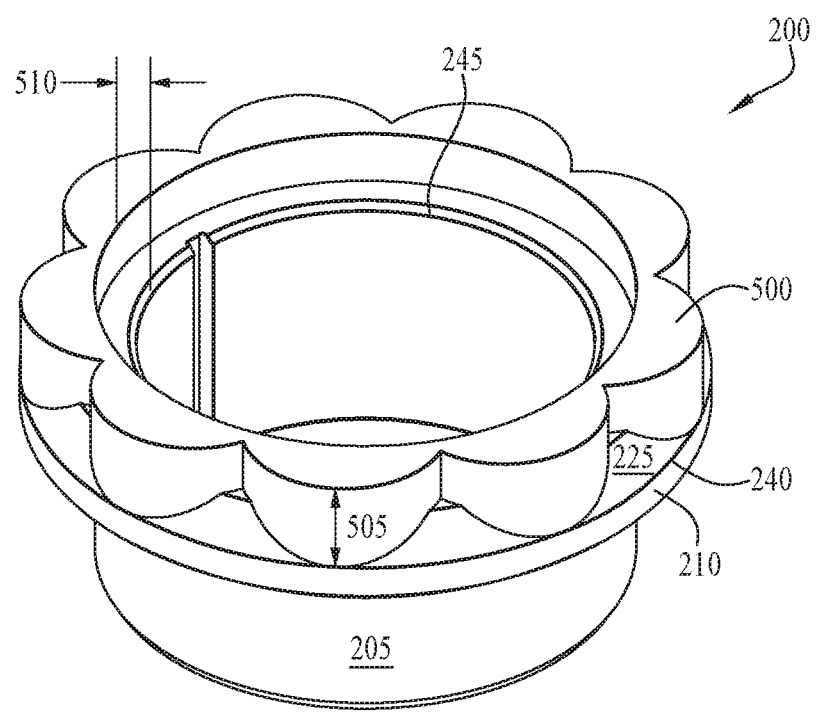
FIG. 5 is a perspective view of a foiled flanged sleeve of an illustrative embodiment.

In some embodiments, the swirling member may be a foiled surface such as a leaf, petal, clover or flower-shaped curve formed by the cusping of an arch or circle. FIG. 5 illustrates an exemplary foiled flanged sleeve of an illustrative embodiment. In FIG. 5, an enneafoil is illustrated, but arced shapes having other numbers of petals may also be employed, for example a hexafoil, pentafoil, octofoil or quatrefoil. In foiled embodiments, outer diameter 240 of flange 210 may be itself molded into the shape of foil 500 and extended axially upwards, and/or foil 500 may be a raised platform molded, adhered or ground onto downstream surface 225 of flange 210, such that the axial height 505 of flange 210 is extended downstream towards an impeller positioning member (such as an impeller hub or standoff sleeve) and/or impeller bottom. Clearance 510 may remain open and/or uncovered by foil 500 to allow a standoff sleeve or impeller hub to contact inner diameter 245. In one exemplary embodiment, where the inner diameter of the standoff sleeve is 1.193 inches and the inner diameter of foil 500 is 1.411 inches, clearance 510 may be about 0.110 inches.

Figure 6:
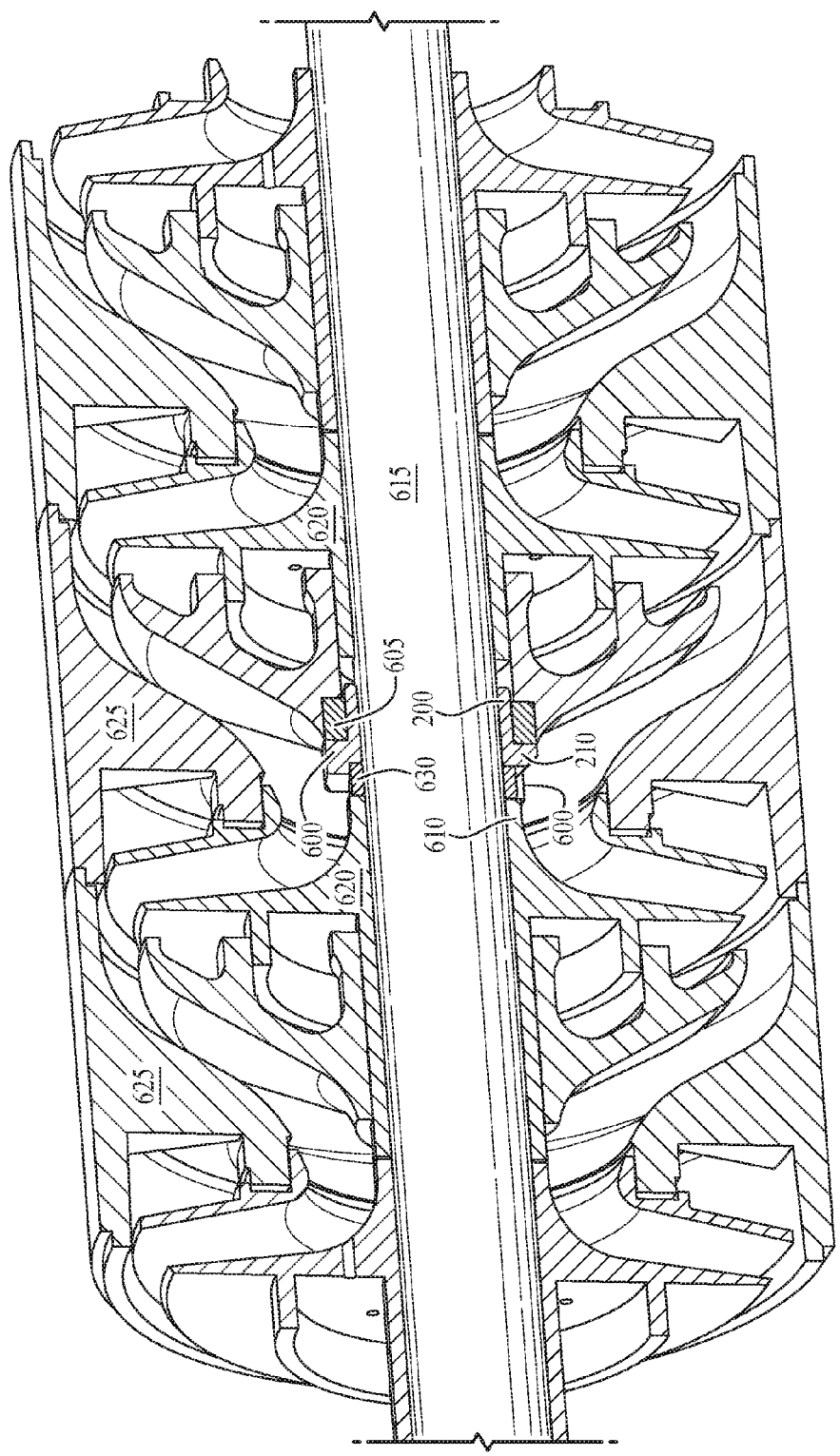
FIG. 6 is a cross sectional view of a stage of an illustrative embodiment.

FIG. 6 illustrates a floater-style centrifugal pump stage of an illustrative embodiment. In the embodiment of FIG. 6, three stages are shown with the thrust bearing surface of illustrative embodiments included in one of the three stages. In other embodiments, the thrust bearing surface of illustrative embodiments may be included in multiple stages or every stage. The stages may be incorporated into a pump, charge pump or gas separator of an ESP assembly. As shown in FIG. 6, impeller hub 610 may place impeller 620 into its operating position when supported by rotating member 200. Rotating member 200 may be directly below impeller 620, as illustrated in FIG. 6. Bushing 605 may be stationary during pump operation and pressed into diffuser 625 or carrier. Swirling member 600 may protrude axially from downstream surface 225 (shown in FIG. 2) of flange 210 towards bottom of impeller 620, which impeller 620 may be directly above rotating member 200. Swirling member 600 may extend axially and may contact and/or extend towards impeller hub 610 and/or standoff sleeve 630. As shown in FIG. 6, standoff sleeve 630 may extend between swirling member 600 and shaft 615, filling clearance 510 as it extends between rotating member 200 and impeller hub 610.

Rotating member 200 with swirling members 600 may be molded into a single solid piece or may be braised, ground or adhered together. As rotating member 200 rotates with shaft 615, swirling member(s) 600 may modify the flow path of pumped fluid and abrasives carried within the pump fluid in an upwards and outwards direction, rather than downwards to a previous stage. Swirling member 600 may be fin 220, ramp 310, foil 500 or other shape that may provide the improved leak resistant benefits described herein. In embodiments where no standoff sleeve 630 is employed, height 505 (shown in FIG. 4) of swirling member 600 may support impeller hub 610 in its operating position. In such instances clearance 510 may be zero and swirling member 600 may extend from outer diameter 240 to all the way to inner diameter 245 of flange 210, and the running position of impeller 620 may be determined by height 505 of swirling member 600 proximate inner diameter 245.

Illustrative embodiments may provide a thrust bearing surface for floater-style centrifugal pumps. The thrust bearing surface of illustrative embodiments may provide one or more swirling members on a top side of a flange of a rotatable member of a thrust bearing set. The thrust bearing set may be located in a stage of a floater-style pump, charge pump or gas separator. As the rotatable member rotates, the swirling member(s) may cause abrasive solids contained in working fluid to swirl upwards towards a successive stage instead of falling down towards the thrust bearing and causing erosive damage. Illustrative embodiments described herein may improve the abrasive handling capability and/or leak resistance of thrust bearing surfaces of illustrative embodiments.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A rotating member of a thrust bearing surface comprising:
    a sleeve securable to a rotatable shaft of a stage;
    a flange extending radially around a top of the sleeve; and
    at least one swirling member extending axially downstream from a top of the flange towards a bottom of an impeller;
    wherein each of the at least one swirling member extends along the top of the flange from an outer diameter towards an inner diameter of the flange.

2. The rotating member of claim 1, wherein there are a plurality of swirling members arranged circumferentially around the top of the flange.

3. The rotating member of claim 1, wherein each of the at least one swirling member terminates prior to the inner diameter to form a clearance occupied by one of an impeller hub or a standoff sleeve.

4. The rotating member of claim 1, wherein each of the at least one swirling member is one of fin, ramp or foil shaped.

5. The rotating member of claim 1, wherein the flange comprises a circumferential chamfer and the at least one swirling member extends over at least a portion of the chamfer.

6. The rotating member of claim 1, wherein each swirling member is a ramp comprising a sloped top surface.

7. The rotating member of claim 6, wherein the sloped surface slopes upwards towards a trailing edge of the swirling member.

8. The rotating member of claim 1, wherein each of the at least one swirling member comprises one of a beveled leading edge or a beveled corner on a top surface of the at least one swirling member.

9. The rotating member of claim 1, wherein each of the at least one swirling member commences at the outer diameter and terminates prior to the inner diameter of the top of the flange.

10. The rotating member of claim 1, wherein each of the at least one swirling member commences at the outer diameter and terminates at the inner diameter of the top of the flange.

11. The rotating member of claim 1, wherein the at least one swirling member is a single foil.

12. A centrifugal pump comprising:
a rotatable shaft;
an impeller stacked on the shaft;
a rotatable sleeve secured around the shaft below the impeller, the sleeve comprising a flange extending radially on a downstream side of the rotatable sleeve; and
a swirling member protruding axially downstream from the flange.

13. The centrifugal pump of claim 12, wherein the swirling member is one of a hexafoil, quatrefoil or enneafoil.

14. The centrifugal pump of claim 12, wherein the swirling member holds the impeller in a running position.

15. The centrifugal pump of claim 12, wherein a standoff sleeve extends between the swirling member and the rotatable shaft.

16. The centrifugal pump of claim 12, wherein the swirling member is one of a ramp or fin.

17. A thrust bearing system for a floater-style stage comprising:
a thrust bearing surface comprising a rotatable member, the rotatable member comprising a tubular sleeve and a flange extending radially on a downstream side of the tubular sleeve;
a swirling member on a top of the flange, the swirling member extending axially towards a bottom of an impeller, wherein as the swirling member rotates, the swirling member guides working fluid in an outwards and upwards direction from the swirling member.

18. The thrust bearing system of claim 17, wherein the swirling member comprises a plurality of fins.

19. The thrust bearing system of claim 18, wherein there are five fins spaced around the top of the flange.

20. The thrust bearing system of claim 18, wherein each of the plurality of fins extends radially between an outer diameter and inner diameter of the radial surface of the flange.

21. The thrust bearing system of claim 17, wherein the swirling member comprises a foil.

22. The thrust bearing system of claim 17, wherein one of a hub of the impeller or a standoff sleeve is between the swirling member and a shaft, the rotatable member secured to the shaft.

23. The thrust bearing system of claim 17, wherein the thrust bearing surface is downhole in subsurface formation and the working fluid comprises one of water, oil, natural gas or a combination thereof.

* * * * *